UNITED STATES PATENT OFFICE.

WALTER MURRAY SANDERS, OF IOLA, KANSAS.

PROCESS OF CONCENTRATING ORES.

No. 805,382.          Specification of Letters Patent.          Patented Nov. 21, 1905.

Application filed February 7, 1905. Serial No. 244,640.

*To all whom it may concern:*

Be it known that I, WALTER MURRAY SANDERS, a citizen of the United States, residing at Iola, in the county of Allen and State of Kansas, have invented certain new and useful Improvements in Processes of Concentrating Ores, of which the following is a specification.

This invention is a process of concentrating ores by means of non-acid solutions.

It has heretofore been proposed to separate sulfid ores from their gangue by means of acids or acid solutions, the acid reacting with the sulfid to liberate hydrogen sulfid, the adhering bubbles of which are capable of carrying the finely-divided ore to the surface of the liquid.

I have discovered that sulfid ores, and particularly zinc sulfid, are capable of reacting with certain non-acid solutions to liberate hydrogen sulfid, which serves to sustain and transport the particles of ore. For the separation of zinc sulfid from a gangue containing fluor-spar, barite, silica, rhodonite, &c., I have successfully used a neutral or somewhat basic solution containing aluminium sulfate, the solution being preferably heated and having a specific gravity of 1.15 to 1.25. Such solution may be conveniently prepared by dissolving low-grade bauxite in sulfuric acid. Non-acid solutions of other of the so-called "earth metals"—as, for instance, ferric sulfate—may be used with good results. The term "earth metals" is here used to indicate the metals of the aluminium, iron, and chromium group. Such non-acid solutions possess several important general advantages over the acids or acid solutions heretofore used. The liquid remains remarkably clear, and by virtue of the viscosity of the solution and its high surface tension the particles of ore may be sustained in the liquid for a very considerable period. This, together with the non-corrosive character of the liquid, permits a wide latitude of design in the construction and of choice in the materials of the separator.

The earth-metal sulfate solutions possess certain special advantages for the concentration of ores containing zinc sulfid. I have found that for the best separation of zinc sulfid the ores should be quite finely pulverized, which under ordinary conditions would involve serious losses in roasting. The earth-metal oxid, however, which results from the decomposition during roasting of the residual sulfate, acts as an effective binder for the fine ores and reduces the dust loss to a minimum. Further, the residual oxid is non-corrosive toward the zinc retorts in the final distillation and often exerts a distinctly-beneficial effect, whereas such compounds as salt-cake, which are reducible to sulfids, are unsuited for use by reason of their corrosive action on the retorts.

I do not limit myself to any particular form of apparatus for the treatment of ore nor to any specific means for the separation of the concentrate.

I employ the term "ore" as including tailings, residues, or concentrates which are capable of reacting with non-acid solutions of the character described to evolve a gas capable of raising or sustaining the divided material in the solution.

I claim—

1. The method of concentrating ore, which consists in subjecting it to a non-acid solution capable of reacting with evolution of gas, and collecting such particles as are sustained by the evolved gas, substantially as described.

2. The method of concentrating ore, which consists in subjecting it to a non-acid solution containing a sulfate of an earth metal, and collecting such particles as are sustained by the evolved gas, substantially as described.

3. The method of concentrating sulfid ores, which consists in subjecting them to a non-acid solution containing a sulfate of an earth metal, and collecting such particles as are sustained by the evolved gas, substantially as described.

4. The method of concentrating zinc-sulfid ore, which consists in subjecting it to a non-acid solution containing a sulfate of an earth metal, and collecting such particles as are sustained by the evolved gas, substantially as described.

In testimony whereof I affix my signature in presence of two witnesses.

WALTER MURRAY SANDERS.

Witnesses:
E. G. DANFORTH,
A. W. HAIGLER.